US009053260B2

(12) United States Patent
Romatier et al.

(10) Patent No.: US 9,053,260 B2
(45) Date of Patent: Jun. 9, 2015

(54) UTILIZING SPREADSHEET USER INTERFACES WITH FLOWSHEETS OF A CPI SIMULATION SYSTEM

(75) Inventors: Christophe Romatier, Chicago, IL (US); Richard Huang, Vernon Hills, IL (US); Ronald Klecka, Crystal Lake, IL (US)

(73) Assignee: Honeywell International Inc., Morristown, NJ (US)

( * ) Notice: Subject to any disclaimer, the term of this patent is extended or adjusted under 35 U.S.C. 154(b) by 851 days.

(21) Appl. No.: 12/422,522

(22) Filed: Apr. 13, 2009

(65) Prior Publication Data

US 2010/0262900 A1    Oct. 14, 2010

(51) Int. Cl.
*G06F 17/24*     (2006.01)
*G06F 17/50*     (2006.01)
*G05B 17/02*     (2006.01)
*G06F 17/25*     (2006.01)

(52) U.S. Cl.
CPC ............ *G06F 17/5009* (2013.01); *G05B 17/02* (2013.01); *G06F 2217/04* (2013.01)

(58) Field of Classification Search
CPC .................................................... G06F 17/246
USPC .......... 700/117, 30, 32, 95; 703/18, 19, 22, 6, 703/8; 705/60, 7.28; 706/45; 715/765, 219; 717/163
See application file for complete search history.

(56) References Cited

U.S. PATENT DOCUMENTS

| | | | | |
|---|---|---|---|---|
| 3,205,205 A * | 9/1965 | Adams | ............................ | 526/137 |
| 5,347,466 A * | 9/1994 | Nichols et al. | ................... | 703/18 |
| 5,402,367 A * | 3/1995 | Sullivan et al. | .................... | 703/6 |
| 5,666,297 A * | 9/1997 | Britt et al. | ........................ | 703/18 |
| 5,893,123 A * | 4/1999 | Tuinenga | ....................... | 715/209 |
| 5,917,730 A * | 6/1999 | Rittie et al. | ......................... | 703/6 |
| 6,029,158 A * | 2/2000 | Bertrand et al. | .................. | 706/45 |
| 6,041,263 A * | 3/2000 | Boston et al. | .................... | 700/32 |
| 6,167,364 A * | 12/2000 | Stellenberg et al. | ............. | 703/19 |
| 6,311,093 B1 * | 10/2001 | Brown | ............................ | 700/95 |
| 6,311,095 B1 * | 10/2001 | Brown | ........................... | 700/117 |
| 6,442,515 B1 * | 8/2002 | Varma et al. | ..................... | 703/22 |
| 6,745,385 B1 * | 6/2004 | Lupu et al. | ...................... | 717/163 |
| 7,080,044 B1 * | 7/2006 | Cordery et al. | ................. | 705/60 |
| 7,257,451 B2 * | 8/2007 | Carpency et al. | ............... | 700/30 |

(Continued)

OTHER PUBLICATIONS

Aspen Simulation Workbook 2006.5 Guide, Oct. 2007, Aspen Technology, Version 2006.5.*

(Continued)

*Primary Examiner* — James J Debrow
(74) *Attorney, Agent, or Firm* — Jetter & Associates, P.A.

(57) ABSTRACT

A simulation system includes at least one processor configured to execute a computer program product, stored upon a storage medium. The computer program product includes a spreadsheet application, a process simulation application, and an integration tool (e.g., eSim), where the spreadsheet application and the process simulation application are discrete, stand alone products. The process simulation application can simulate chemical processes using at least one flowsheet, which models a general flow of chemical plant processes and equipment. The integration tool can map process simulation application objects and properties to spreadsheet application objects, can convey information between mapped objects, can perform case management functions, and can perform orchestrated calculation functions.

16 Claims, 4 Drawing Sheets

(56) References Cited

U.S. PATENT DOCUMENTS

| | | | |
|---|---|---|---|
| 7,313,505 B2* | 12/2007 | Brown | 703/6 |
| 7,376,548 B2* | 5/2008 | Sinclair | 703/22 |
| 7,599,822 B2* | 10/2009 | Hearn et al. | 703/2 |
| 2002/0169658 A1* | 11/2002 | Adler | 705/10 |
| 2003/0036892 A1* | 2/2003 | Burge et al. | 703/8 |
| 2003/0169295 A1* | 9/2003 | Becerra, Jr. | 345/765 |
| 2005/0102127 A1* | 5/2005 | Crowe et al. | 703/22 |
| 2006/0026584 A1* | 2/2006 | Muratori et al. | 717/163 |
| 2012/0232875 A1* | 9/2012 | Devereux | 703/12 |
| 2013/0013994 A1* | 1/2013 | Handsaker et al. | 715/217 |

OTHER PUBLICATIONS

UniSim Design User Guide, Jun. 2005, Honeywell, R350 Release.*

* cited by examiner

UTILIZING SPREADSHEET USER INTERFACES WITH FLOWSHEETS OF A CPI SIMULATION SYSTEM

BACKGROUND

The present invention relates to the field of process simulation in the chemical process industry (CPI) and, more particularly, to utilizing spreadsheet user interfaces to flowsheets of a CPI simulation system.

The chemical process industry (CPI) has long used machines to aid in mathematically modeling a process and its unit operations from first principles. Today, numerous process simulation systems (e.g., Honeywell UNISIM, HYSYS, Aspen OTS, Shadow Plant, Fantoft, etc.) exist that are able to perform steady-state and dynamic simulations. These simulations often lead to optimizations and improvement throughout a plant lifecycle, which includes a conceptual design stage, a plant design stage, control implementation stage, procedure development stage, operator training stage, and a production stage.

An ideal user base for process simulation systems includes control engineering personnel. Unfortunately, conventional process simulation systems have been relatively difficult to use, especially dynamic systems, which have resulted in a need for simulation specialist to operate the simulation systems. It would be advantageous, yet presently not possible, to enable control engineers to access the functionality of a process simulation system utilizing tools and/or interfaces with which they are inherently familiar, such as utilizing user interfaces of conventional spreadsheet applications.

SUMMARY

One aspect of the disclosure includes a simulation system that includes at least one processor configured to execute a computer program product, stored upon a storage medium. The computer program product can include a spreadsheet application, a process simulation application, and an integration tool (e.g., eSim), where the spreadsheet application and the process simulation application are discrete, stand alone products. The process simulation application can simulate chemical processes using at least one flowsheet, which models a general flow of chemical plant processes and equipment. The integration tool can map process simulation application objects and properties to spreadsheet application objects, can convey information between mapped objects, can perform case management functions, and can perform orchestrated calculation functions.

Another aspect of the disclosure includes a method for performing chemical process simulations. In the method, user input designating a flowsheet of a process simulation application can be received from within a user interface of the spreadsheet application. An object browser interface associated with the designated flowsheet can be initialized from within the user interface of the spreadsheet application. Objects associated with the flowsheet can be dynamically determining at runtime. A hierarchy of objects can be populated in an object browser interface based upon the determined results. A user selection of one of the populated objects can be received via the object browser interface. Properties associated with the selected one of the objects can be dynamically determining at runtime. The properties can be presented within a properties area of the object browser for user selection and manipulation. User input can be received from the object browser. Based upon the user input, at least one flowsheet of a process simulation application can be mapped to at least one spreadsheet of a spreadsheet application. A one-to-one correspondence can exist between flowsheets and spreadsheets. An input can be received to execute a run of the flowsheet from a user interface of the spreadsheet application, which results in an execution of the flowsheet by the process simulation application. Input used in the run can be acquired from values specified in cells of a spreadsheet in accordance with the mapping. Output from the execution of the flowsheet can be recorded in cells of the spreadsheet in accordance with the mapping.

Still another aspect of the disclosure includes a method for performing multiple chemical process simulations. In the method, at least one flowsheet of a process simulation application can be mapped to at least one spreadsheet of a spreadsheet application. A one-to-one correspondence can exist between flowsheets and spreadsheets. The spreadsheet application and the process simulation application can each be discrete, stand-alone software products. Input for a flowsheet run executed by the simulation application can be acquired from a spreadsheet of the spreadsheet application based upon the mapping. Output from the flowsheet run executed by the simulation application can be conveyed to a spreadsheet based upon the mapping. A batch of a set of runs of the process simulation application can be sequenced. Each run can result in a flowsheet execution by the process simulation application based upon input acquired from a spreadsheet. Input utilized in later ones of the sequenced runs can be obtained from output from earlier ones of the runs of the batch.

DETAILED DESCRIPTION

Figure 1:
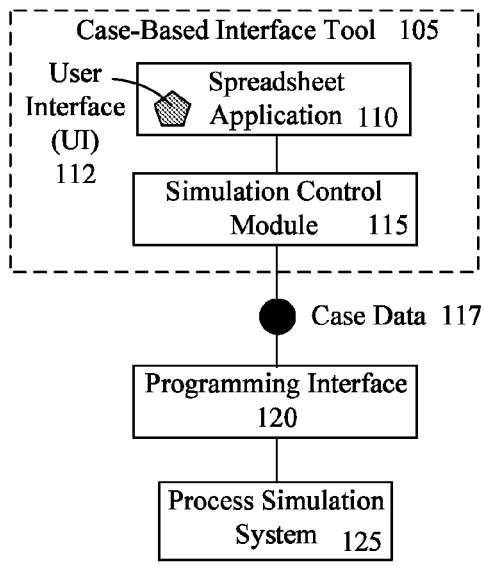
FIG. 1 is a schematic diagram depicting a system utilizing a case-based interface tool to provide case-based interaction with a process simulation system in accordance with embodiments of the inventive arrangements disclosed herein.

The present disclosure concerns utilizing spreadsheet (e.g., EXCEL) user interfaces with flowsheets of a chemical process industry (CPI) simulation system. The disclosure provides an integration tool (e.g., eSim) that links input and output of a flowsheeting software application to a spreadsheet interface. The integration tool also provides case management capabilities and orchestrated calculation capabilities.

After linking, input specified in a spreadsheet interface can be used as input for the process simulation system, and output generated by the process simulation can be written to a linked spreadsheet. In one embodiment, the linkages between the spreadsheet interface and the process simulation system can utilize a flexible object model that resolves stored links at runtime. In other words, the flexible object model can use a generic mapping methodology that does not rely upon static extensions, which have to be continuously updated and changed as changes occur for the process simulation system.

Case management permits multiple runs to be performed for the same flowsheet, where each column of a spreadsheet in the spreadsheet interface can correspond to a run. Further, multiple flowsheets can co-exist and co-function that are linked to a single spreadsheet workbook. Thus, a user can centralize input, run results, and calculations that would traditionally be scattered across multiple different workbooks and/or flowsheets.

Orchestration calculation capabilities permit batch runs according to user configurable triggers. That is, batch runs can be sequenced relative to each other, where later runs can use results from previous runs as input. Thus, dependencies can be established for a sequenced of runs of arbitrary complexity. For example, assuming fifteen different data sets are used as input for different sequenced runs, each taking approximately a half-hour to execute, the calculation orchestration capability can permit a user to configure a run in the evening (which will take approximately seven and one-half hours to complete) begin the run at a programmatically established time (i.e., during off peak hours starting at 11:00 PM, for example) so that results of the runs are available to the user (output to a designated spreadsheet) the next day.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram depicting a system 100 utilizing a case-based interface tool 105 to provide case-based interaction with a process simulation system 125 in accordance with embodiments of the inventive arrangements disclosed herein. In system 100, a case-based interface tool 105 can be used to interact with the process simulation system 125 in lieu of and/or in addition to an existing and/or integrated user interface of the process simulation system 125. The simulation control module 115 and the programming interface 120 can together be considered an integration tool, which seamless integrate application 110 and system 125 so that a user interface of the spreadsheet application 110 can be linked to flowsheets (e.g., a process flow diagram) of system 125.

The integration tool can include data automation capabilities, case management capabilities, and/or calculation orchestration capabilities. Data automation can refer to linking/mapping simulation system 125 objects and properties to spreadsheet application 110 objects. The data automation can be based upon a flexible object model that exposes virtually all simulation system objects and their associated properties. In one embodiment, the interface 112 can be a data automation component that includes a browser interface for dynamically browsing system 125 and objects. The browser interface can consolidate all simulation system objects into one hierarchy and all properties of an object into another hierarchy. Case management mechanisms can assist with managing data from different runs of the same flowsheet (in a common spreadsheet) and managing data from different flowsheets within a common workbook. The calculation orchestration capabilities of the integration tool permit programmatic triggers to be established to ensure runs execute whether a set of previously defined conditions are satisfied. The calculation orchestration capabilities permits sequential batch processing of multiple runs to be initiated at a given time, where later runs can optionally utilize input data created during earlier ones.

In one embodiment, the spreadsheet application 110 can be a commercial off-the-shelf application, such as EXCEL, QUATROPRO, CALC, etc. The process simulation system 125 can also be a commercial off-the shelf system, such as UNISIM, HYSYS, ASPEN OTS, etc. Generally, spreadsheet application can be a computer program product that includes a graphic user interface for interacting with users. The graphical user interface can include a grid of a set of cells arranged in rows and columns. Each cell can be associated with a cell specific value able to be uniquely addressed as a spreadsheet object. The spreadsheet application can be configured to associate at least one formula with a cell. A value of the cell is able to be calculated based upon said associated formula.

Turning to specific components of system 100, the case-based interface tool 105 can represent a software application that can be configured to capture and exchange case data 117 with the process simulation system 125. Case data 117 can represent a set of user-configured parameters collected within the user interface 112 of the case-based interface tool 105 and/or the results of a simulation run by the process simulation system 125 for the set of user-configured input parameters. In various embodiments, output from multiple runs (e.g., one per spreadsheet column) on the same flowsheet can be presented in a single spreadsheet; different flowsheets can be associated with different spreadsheets of a single workbook. Additionally, calculations can be orchestrated using tool 105 so that sequenced runs can occur, based upon different input sets and producing different output data sets.

To perform these functions, the case-based interface tool 105 can utilize a spreadsheet application 110 and a simulation control module 115. The spreadsheet application 110 can represent a software program capable of storing data in a tabular format and performing various manipulations upon the data, such as calculations, comparisons, and graphing. Additionally, the spreadsheet application 110 can support the use of user-defined functions and/or program extensions like a MACRO.

The spreadsheet application 110 can be used as a vehicle for presenting the user interface 112 of the case-based interface tool 105. The user interface 112 can be configured to provide an input mechanism for case data 117 entered by a user (not shown). Additionally, resultant output case data 117 can be collectively presented within the user interface 112, utilizing the tabular format and/or data manipulation functions of the spreadsheet application 110.

In one embodiment, the spreadsheet application 110 can be a template with some specific format and structure features required by the case-based interface tool 105. That is, users of the interface 112 should start new work from an empty template or load an existing workbook created from a template configured for the tool 112. Multiple workbooks of a spreadsheet can be concurrently open, where an active workbook is the one that the case-based interface tool 105 controls.

The simulation control module 115 can represent a set of machine-readable instructions for managing the flow of data between the case-based interface tool 105 and the process simulation system 125. The simulation control module 115 can be capable of communicating with the spreadsheet application 110 and the process simulation system 125. Functions of the simulation control module 115 can include, but are not limited to, conveying case data 117 to the process simulation system 125, mapping case data 117 received from the process simulation system 125 to the corresponding areas of the user interface 112, triggering the execution of user-defined functions, triggering the execution of functions for the spreadsheet application 110 and/or process simulation system 125, and the like.

The simulation control module 115 can also be configured to automate the sequential execution of multiple sets of case data 117 by the process simulation system 125. That is, when the case-based interface tool 105 is provided with multiple sets of case data 117 for the same process, the simulation control module 115 can oversee the individual execution of each set of case data 117 by the process simulation system 125 without further action required by the user.

In one embodiment (elaborated upon in system 200), module 115 can be implemented as an add-in (e.g., an EXCEL add-in or "XLA" file, for example). In this embodiment, the XLA can be referenced in a special workbook (e.g., an eSim workbook), so that it is launched or enabled when an eSim workbook is opened or activated. The XML controls the eSim user interface through EXCEL menu and VISUAL BASIC (VB) forms. The XLA can also parse data through an eXtensible Markup Language (XML) format between a template workbook and interface 120, which can be an execution mechanism. Module 115 (e.g., the XLA) does not necessarily directly interact with system 125, but can utilize interface 120 as a communication intermediary. In one embodiment, the XLA (module 115) can be password protected to prevent incidental modification by the users.

The case-based interface tool 105 can utilize a programming interface 120 to communicate with the process simulation system 125. The programming interface 120 can represent a software application and/or set of software commands designed to act as an interface mechanism to a target system and/or application. For example, a programming interface 120 can translate received commands into the corresponding commands understood by the target system. In one embodiment, interface 120 can comprise a set of components (mostly DLLs) to interact with server side (system 125) components. That is, the interface 120 can provide data automation functionality to requests from module 115 (e.g., XLA requests).

The process simulation system 125 can represent one or more software applications and/or associated hardware components configured to perform a variety of calculations to simulate the execution of a defined process. Each simulation performed by the process simulation system 125 can be governed by a specified set of input parameters provided as case data 117.

In one embodiment, the simulation system 125 can be a simulator for the chemical processing (CPI) that mathematically models a process and its unit operations. System 125 can perform stead-state and/or dynamic simulations. System 125 can be used to create a process flow diagram or flowsheet which simulates a general flow of plant processes and equipment. That is, a flowsheet can model relationships between major equipment of a plant factory. System 125 can include a graphic design tool that includes a canvas upon which a flowsheet can be constructed using selectable flowsheet symbols, such as valves, pumps, tanks, vessels, heat exchangers, fans, lines, flow instruments, and other symbols.

Some specifics of system 100 will vary depending upon specifics of the spreadsheet application 110 and the process simulation system 125. For example, one contemplated embodiment uses EXCEL as the spreadsheet application 110 and UNISIM as the process simulation tool 125. In this embodiment, the application 110 can be an EXCEL worksheet based upon a template. The simulation control module 115 can be an EXCEL add-in (e.g., an XLA or XLL). The programming interface 120 can be the UOP UNISIM application interface control (AIC) that is a set of components, including numerous DLLs, developed by UOP RPM group to execute UNISIM runs on the server side.

Figure 2:
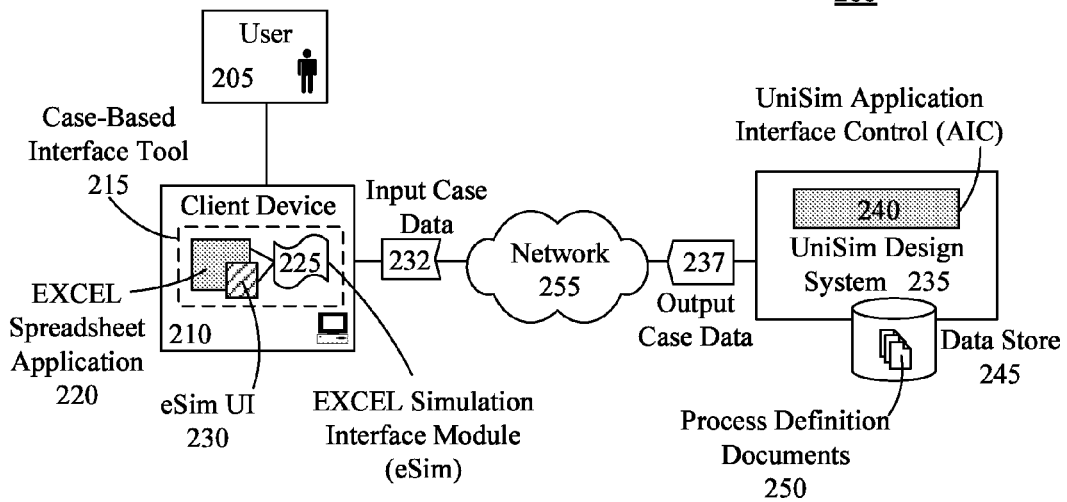
FIG. 2 is a schematic diagram illustrating a system for a case-based interface tool for the UNISIM DESIGN system in accordance with embodiments of the inventive arrangements disclosed herein.

FIG. 2 is a schematic diagram illustrating a system 200 for a case-based interface tool 215 for the UNISIM DESIGN system 235 in accordance with embodiments of the inventive arrangements disclosed herein. System 200 can represent a specific embodiment of system 100 of FIG. 1.

In system 200, a user 205 can utilize the case-based interface tool 215 running on a client device 210 to run simulations for input case data 232 using the UNISIM DESIGN system 235. The client device 210 can represent a variety of electronic computing devices capable of supporting operation of the case-based interface tool 215 and/or its components. Examples of a client device 210 can include, but are not limited to, a personal computer, a laptop computer, a handheld computing device, a thin client, and the like.

The case-based interface tool 215 can consist of an EXCEL spreadsheet application 220, an EXCEL simulation interface module (eSim) 225, and the eSim user interface (UI) 230. The EXCEL spreadsheet application 220 can provide the case-based interface tool 215 with a variety of predefined functions for data analysis and graphical reporting as well as the foundation for the eSim UI 230.

The eSim UI 230 can present the user 205 with access to the functions supported by the eSim 225 as well as a user-friendly interface mechanism by which to enter input case data 232. The eSim UI 230 can be configured to utilize the inherent functions of the EXCEL spreadsheet application 220, such as data formatting and mathematical calculations. For example, the eSim UI 230 can correspond to an EXCEL template document containing areas designated for data entry and/or presentation.

Entry of the input case data 232 can include manual data entry that results in values for input parameters being directly captured using the eSim UI 230 and the specification of an external file containing the input case data 232 to be imported during execution of the simulation. The import functionality can be provided by the EXCEL spreadsheet application 220. It should be noted that the external file must be readable by the EXCEL spreadsheet application 220.

The data entry process of the eSim UI 230 can utilize the contents of process definition documents 250, often referred to as flowsheets, maintained by the UNISIM DESIGN system 235 within a data store 245. A process definition document 250 can define the data elements and their associated properties utilized by the UNISIM DESIGN system 235 to perform a simulation of the process. Thus, the case-based interface tool 215 can limit data entry into the eSim UI 230 to the data elements contained within the corresponding process definition document 250. Doing so can ensure data type compatibility between the input case data 232 and the data expected by the UNISIM DESIGN system 235.

Upon completion of data entry, the user 205 can execute a command requesting that the eSim 225 run the simulations using the UNISIM DESIGN system 235 for the input case data 232. The eSim 225 can then convey each set of input case data 232 over the network 250 to the UNISIM DESIGN system 235. Messages utilized by the eSim 225 to convey the input case data 232 can also include commands that can be interpreted by the UNISIM application interface control (AIC) 240 to allow the eSim 225 to configure the simulation.

Performance of a simulation by the UNISIM DESIGN system 235 for a set of input case data 232 can produce a set of output case data 237. The output case data 237 can be returned to the case-based interface tool 215 using the network 255 and/or UNISIM AIC 240. The eSim 225 can process the output case data 237 for presentation within the eSim UI 230.

Processing of the output case data 237 can include the performance of one or more functions, either user-defined or inherent to the EXCEL spreadsheet application 220, upon one or more data values. For example, the value of an input parameter of the next input case can be modified when a simulated result value falls within a user-defined range, allowing for the input parameters of the input case data 232 to be gradually modified based upon the output case data 237.

It is important to emphasize that the case-based interface tool 215 illustrated in system 200 provides functionality currently unavailable in the present interface provided for the UNISIM DESIGN system 235. For example, using the EXCEL spreadsheet application 220 provides users 205 with the ability to specify multiple sets of input case data 232 at one time as well as to collectively view the corresponding output case data 237. Additionally, output case data 237 can be graphically presented as graphs or charts to increase synthesis and comprehension.

In an alternate embodiment, the EXCEL spreadsheet application 220 and/or the eSim UI 230 and/or the eSim 225 can be remotely located to but accessible by the client device 210. For example, these components 220/225/230 can be located upon a server (not shown) that is accessible to the client device 210 over the network 250 and to which the user 205 has the proper privileges.

Network 255 can include any hardware/software/and firmware necessary to convey data encoded within carrier waves. Data can be contained within analog or digital signals and conveyed though data or voice channels. Network 255 can include local components and data pathways necessary for communications to be exchanged among computing device components and between integrated device components and peripheral devices. Network 255 can also include network equipment, such as routers, data lines, hubs, and intermediary servers which together form a data network, such as the Internet. Network 255 can also include circuit-based communication components and mobile communication components, such as telephony switches, modems, cellular communication towers, and the like. Network 255 can include line based and/or wireless communication pathways.

As used herein, presented data store 245 can be a physical or virtual storage space configured to store digital information. Data store 245 can be physically implemented within any type of hardware including, but not limited to, a magnetic disk, an optical disk, a semiconductor memory, a digitally encoded plastic memory, a holographic memory, or any other recording medium. Data store 245 can be a stand-alone storage unit as well as a storage unit formed from a plurality of physical devices. Additionally, information can be stored within data store 245 in a variety of manners. For example, information can be stored within a database structure or can be stored within one or more files of a file storage system, where each file may or may not be indexed for information searching purposes. Further, data store 245 can utilize one or more encryption mechanisms to protect stored information from unauthorized access.

It should be appreciated that specifics of embodiment 200 can be adapted to utilize other software applications than those illustrated. For example, in one embodiment, COREL QUATROPRO, STAROFFICE CALC, or other spreadsheet applications can be directly substituted for the EXCEL application 220 shown. Similarly, although the embodiment shown by system 200 uses the UNISIM DESIGN SYSTEM 235, other process modeling applications (e.g., HYSYS, ASPEN OTS, INVENSYS, DYNSIM, FANTOFT, TRIDENT, etc.) can be utilized in other embodiments of the disclosure.

Figure 3:
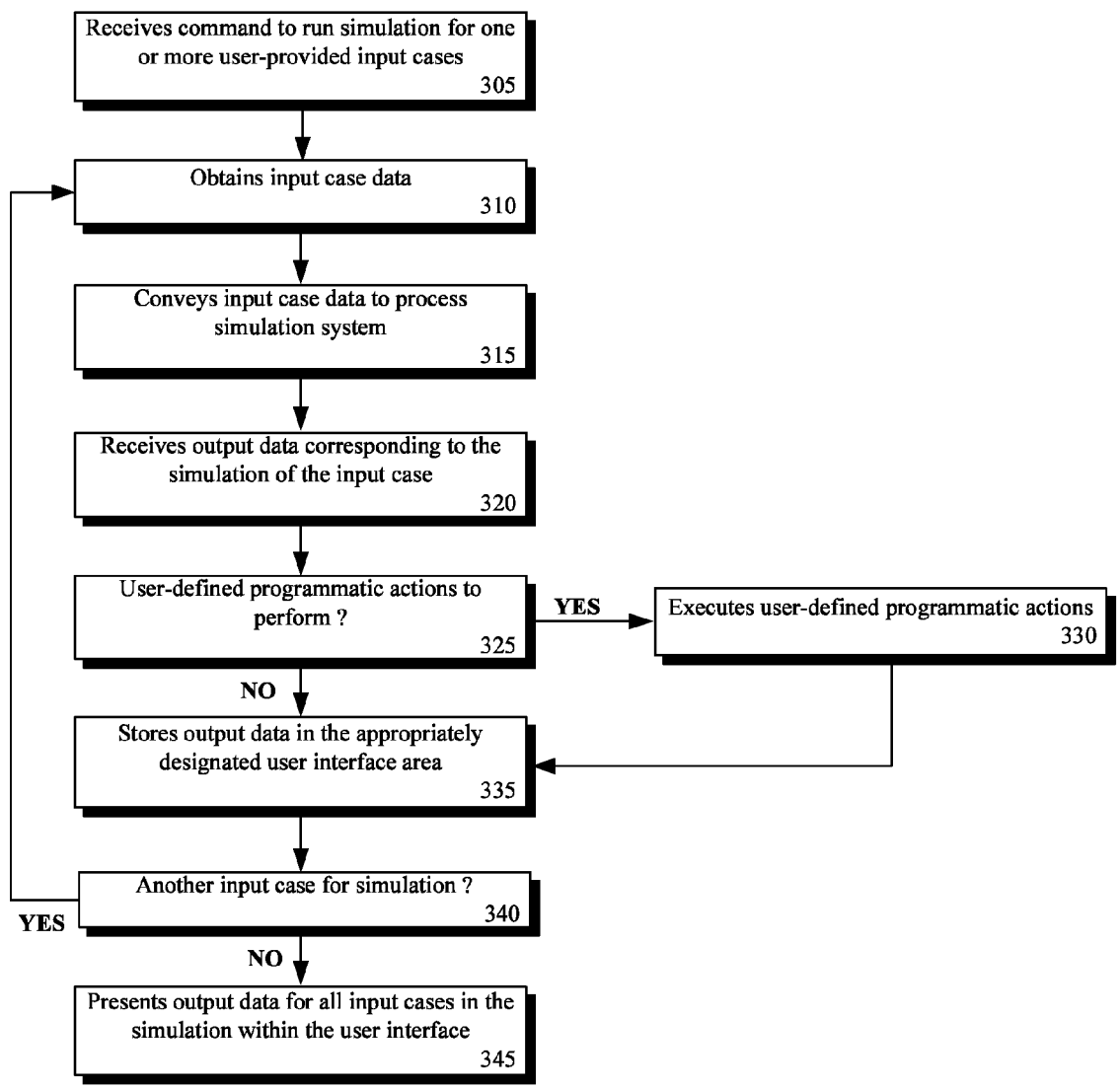
FIG. 3 is a flow chart of a method detailing the basic operation of the case-based interface tool in accordance with an embodiment of the inventive arrangements disclosed herein.

FIG. 3 is a flow chart of a method 300 detailing the basic operation of the case-based interface tool in accordance with an embodiment of the inventive arrangements disclosed herein. Method 300 can be performed in the context of systems 100 and/or 200 and/or any other system configured to provide a case-based interface tool to a process simulation system. Before method 300 begins, it is assumed that mappings have been established between cells in a spreadsheet and objects in a process simulation system. In one embodiment, this mapping can occur dynamically at runtime based upon a flexible object model that uses a generic mapping methodology, which does not rely upon static extensions.

Regardless of how mapping occurs, in step 305 a command can be received to run a simulation for one or more user-provided input cases. This command can result from a user input of the eSim interface or from an execution of a previously established trigger responsive to a detected event. In one embodiment, the trigger and events can be handled by a calculation orchestration component of the integration tool. In step 310, the integration tool can obtains the data for the input case. Acquisition of the input case data can include accessing an external file when specified by the user within the case-based interface tool. This external file can include a spreadsheet input file, which was previously mapped to a flowsheet. The input case data can be conveyed to the process simulation system in step 315. In step 320, the output data corresponding to the simulation of the input case can be received. In one embodiment, this output can be directed towards one or more linked spreadsheets in accordance with previously established mappings.

The case-based interface tool can determine if the output data triggers the performance of user-defined programmatic actions in step 325. The programmatic actions can include actions defined by an orchestration component of the integration tool and/or actions defined by target spreadsheet code (e.g., EXCEL Macros, VBA code, etc.). Any number of configurable trigger conditions can be established. For example, a trigger can fire based upon a certain value of a system time, execution of a specific run, data output to a spreadsheet cell exceeding or failing to achieve an established threshold value, and/or the like. In one embodiment, triggers can include pre- and post-calculation macros and can utilize spreadsheet application functions, as well as capabilities specific to the integration tool and/or the process simulation system.

When the output data triggers the performance of user-defined programmatic actions, flow can proceed to step 330, there triggered code executes to perform the user defined programmatic actions. When user-defined programmatic actions are not triggered for execution or upon completion of step 330, step 335 can execute where the output data can be stored in the appropriately designated area (spreadsheet cells/worksheets) of the user interface.

In step 340, it can be determined if there is another input case for simulation. When there is another input case to simulate, flow of method 300 can return to step 310 to begin reiteration. When another input case does not exist, then the output data for all the input cases of the simulation can be presented within the user interface of the case-based interface tool. Thus, a sequence of runs and/or cases can be executed by method 300. Further, output from multiple runs for different flowsheets can be consolidated into a single spreadsheet application object (workbook) and multiple runs for a common flowsheet can be presented within a single spreadsheet.

It should be noted that the return flow from step 340 when another input case exists can be altered based upon the handling of input case data. That is, when multiple input cases are imported from an external file or entered into the user interface, data can be acquired on a case-by-case basis, as shown in method 300, or as a whole and separated into individual input cases by the case-based interface tool. In the latter situation, flow of method 300 from step 340 can be directed to an intermediary step (not shown) to separate the next input case prior to the continuation of method 300.

Figure 4:
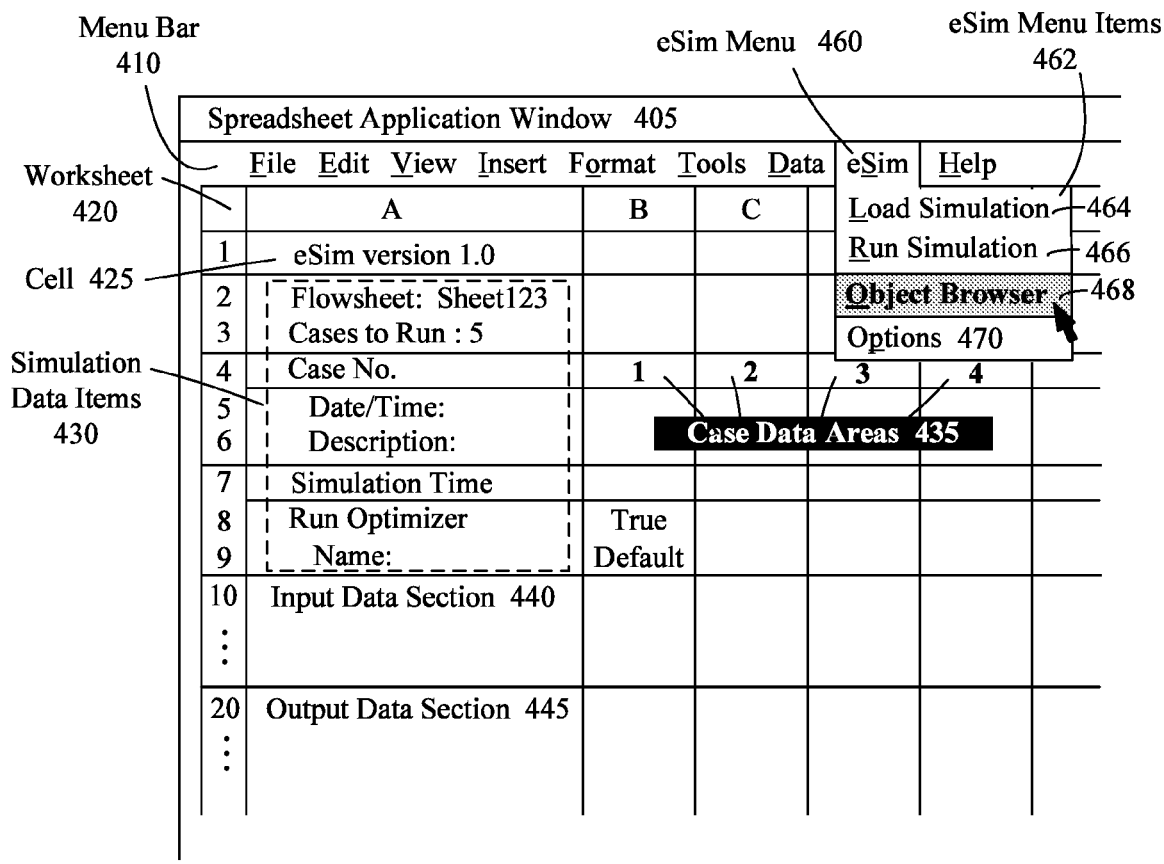
FIG. 4 is an illustration of a sample eSim user interface in accordance with an embodiment of the inventive arrangements disclosed herein.

FIG. 4 is an illustration of a sample eSim user interface 400 in accordance with an embodiment of the inventive arrangements disclosed herein. Sample eSim user interface 400 can be utilized by systems 100, 200, and/or method 300. It should be noted that the sample eSim user interface 400 is for illustrative purposes only and is not meant as a definitive embodiment.

The sample eSim user interface 400 can be presented within a spreadsheet application window 405 of the spreadsheet application utilized by the eSim interface. The spreadsheet application window 405 can be a template for a spreadsheet workbook customized for integration with the process simulation system. A worksheet name can be customized as desired and additional worksheets can be inserted by a user as needed. In one embodiment, color coding can be established so that color-filled cells appearing on the main sheet are reserved. That is, a user may only be able to modify cells of the worksheet without a previously established background color. In one embodiment, a hidden worksheet (e.g., an application control template) can exist which stores eSim options. This hidden worksheet is intended to be preserved and remain hidden.

In one embodiment, a number of ranges can be defined, where modifying or deleting any of these ranges can break underlying code (e.g., VBA code). Thus, these ranges can be protected. Users can add customized ranges for user established purposes.

In one embodiment, different sections of the worksheet can be reserved from inputs to the process simulation system and outputs from the process simulation system. In other words, in one implementation it can be impossible to mix inputs and outputs together and/or to have multiple input and output sections co-exist with each other.

Numerous standards can be established for the spreadsheet interface. As shown, the worksheet 420 can consist of cells 425 identifiable by a unique combination of row and column names. In this example, cell 425 can be identified as row 1, column A. The specific properties of a cell 425, such as data type and format, can be defined by the eSim user interface 400 within the limitations of the underlying spreadsheet application.

The worksheet 420 of the sample eSim user interface 400 can present a variety of information to the user. Of particular note in this example are the simulation data items 430, the case data areas 435, the input data section 440, and the output data section 445.

The simulation data items 430 can represent a variety of fields that present and/or accept data regarding the execution of the simulation by the process simulation system. Examples of simulation data items 430 shown in the sample eSim user interface 400 can include, but are not limited to, the name of the flowsheet corresponding to the process being simulated, the quantity of cases to run the simulation, a description of the simulation, the use of an optimizer during simulation and the name of the optimizer, and the like.

The case data areas 435 can represent sections of the worksheet 420 that collectively identify all data associated with the simulation of a single case. For example, all data associated with the simulation of case 1 will be located in column B of the worksheet 420, case 2 in column C, and so on. This format of case data areas 435 within the worksheet 420 can allow a user to easily compare data values side-by-side for multiple simulations.

The input data section 440 can represent the section of the worksheet 420 where input parameters for the simulation whose values have been configured by the user can be presented. Since the validity of input parameters is crucial for the proper functioning of the process simulation system, the entry of items into the input data section 440 can utilize a specialize mechanism, such as the "Add Input Data" eSim menu item 418.

The output data section 445 can contain the results of the simulation run by the process simulation system utilizing the corresponding user-configured input parameters contained in the input data section 440. The data items listed in the output data section 445 can depend upon the process being simulated. Additionally, data manipulation functions supported by the spreadsheet application can be executed upon the raw values of the data items prior to being displayed in the output data section 445.

It should be appreciated that interface 400 illustrates one contemplated layout and that others are contemplated. These layouts can conform to standards designed to make working with the interface and/or linking to flowsheets easier. As an example of a standard, the following conventions (shown in the below tables) can be imposed upon one implementation of an eSim user interface. These conventions are presented for proof of concept and descriptive purposes only and are not to be construed as a constraint upon the scope of the present disclosure, which can adhere to any definable standard conventions.

| ROW | CONVENTION DESCRIPTION |
| --- | --- |
| Row 1 | eSim template version number, text can be unrestricted |
| Row 3 | Flowsheet file name |
| Row 4 | Calculation case ID (number cases supported) |
| Row 6 | Run numbers of calculation case, used in run simulation form |
| Row 7-8 | Descriptions associated with calculation case |
| Row 9 | Simulation time lapse records showing time required for calculations |
| Row 10 | Trigger for simulation system optimizer, set to true or false |
| Row 11 | Optimizer parameter (e.g., UOPStatic Optimizer.Optimize) |
| Row 12 | Name of the optimizer (multiple optimizers can exist for a flowsheet, but a restriction can exist to run only one at a time) |
| Row 13 | Name of an associated spreadsheet for the optimizer |
| Row 14 | Flag to turn on/off an optimizer |
| Row 16-21 | Input data section - auto expandable, having a characteristic background color (e.g., pale yellow) - portions of the rows can be deleted and named ranges can still be maintained |
| Row 23-30 | Output data section - auto expandable, having a characteristic background color (e.g., light blue) - portions of the rows can be deleted and named ranges can still be maintained. |

| COLUMN | CONVENTION DESCRIPTION |
| --- | --- |
| Column A | Object/property XML path - when configuring eSim, active cells must be in Column A |
| Column B | Description of the eSim object/property |
| Column C | Unit of Measure (conforms to USD optimizer recognizable names) browser can add the units based upon user selection |
| Column D | Usable for any purpose, but should not be deleted |
| Column E-IT | Supports a total of 250 calculation runs |
| Column IU-IV | Not reserved, can be customized by user for any purpose |

As shown in interface 400, the spreadsheet application window 405 can present the user with a menu bar 410, which can be modified to offer an eSim menu 460.

User-selection of the eSim menu 460 can present a variety of eSim menu items 462 corresponding to functions supported by the eSim. The eSim menu 460 can be automatically added to the spreadsheet application window 405 when the eSim user interface 400 is initiated. As shown in this example, the eSim menu 460 contains eSim menu items 462 for loading existing simulation data 464, running a simulation 466, activating the object browser 468, and modifying configuration options 470. Additionally, eSim menu items 462 can be incorporated into other selection mechanisms supported by the spreadsheet application, such as context menus and short-cut key combinations.

The load simulation option 464 can specify which simulation flowsheet is to be worked on in the eSim environment. In one embodiment, if a file has been previously selected (saved at range "eSim_UniSimFlowsheetPath") it will automatically launch the file. Otherwise, a file browser can be active for a user to pick a working simulation flowsheet file. The linkage between the simulation system and the spreadsheet application can be dynamic in that the flowsheets presented for selection responsive to a selection of option 464 can be updated to reflect changes in flowsheet files. Thus, each time a user creates a new flowsheet using a simulation system, that new flowsheet will be available for selection within the eSim interface.

The run simulation option 466 can automate a transfer of data between the spreadsheet application and the process simulation system in accordance with established mappings. In one embodiment, selection of option 466 can open up a run simulation interface. Selection of a run button of the simulation interface can cause simulation calculations to be performed. Numerous modes can exist for simulation executions associated with the run option 466. The modes can include, for example, a run mode, a get inputs mode, a set inputs mode, and a get outputs mode. The run mode can be a default option that is the equivalent to performing a set of actions including: setting inputs in the simulation system, triggering flowsheet calculations/processes, delaying for flowsheet processing to complete, receiving results from flowsheet processing. The get input mode can populate input sections of a spreadsheet linked to a flowsheet with values embedded in the flowsheet. The set inputs mode can set inputs into the simulation system. No calculations or flowsheet processes are triggered nor is output requested when in set inputs mode. The get outputs mode fills output sections of a spreadsheet with data embedded in a flowsheet. This mode can be useful in troubleshooting a flowsheet.

The object browser option 468 activates an object browser interface (such as interface 500). The object browser is used to map or link data references between a spreadsheet and a designated flowsheet. The object browser permits inputs and outputs to be configured in accordance with a flexible object model. That is, effectively all objects and object properties of the simulation system can be presented for selection and linkage to spreadsheet objects. This linkage occurs dynamically at runtime and does not relay upon static extension associated with simulation system objects and/or properties. Thus, changes made to the simulation system, such as code changes to add new objects and/or object properties, are automatically handled by the eSim interface tool without code modifications being needed.

In other words, the eSim interface tool does not require a priori knowledge of names and simulation system objects/properties. These names and properties are queried upon object navigator activation and used to dynamically build two different hierarchies, one for objects and another for object properties.

Figure 5:
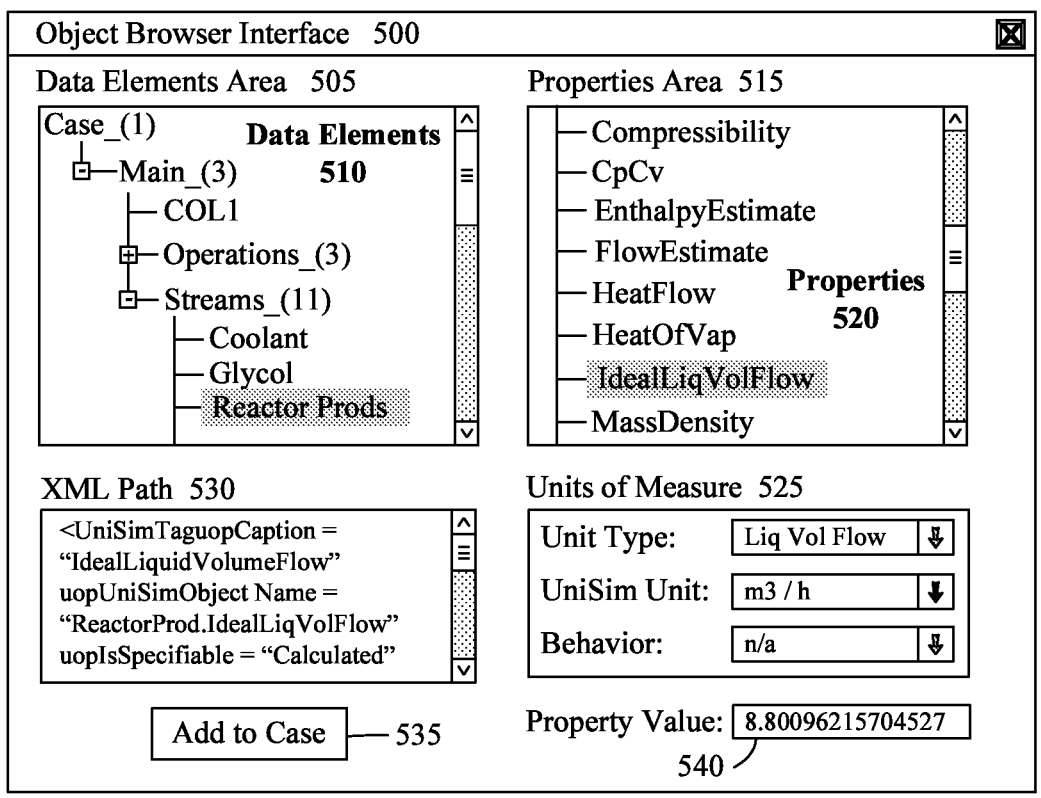
FIG. 5 is an illustration of a sample object browser interface for use with the eSim user interface in accordance with an embodiment of the inventive arrangements disclosed herein.

FIG. 5 is an illustration of a sample object browser interface 500 for use with the eSim user interface in accordance with an embodiment of the inventive arrangements disclosed herein. The object browser interface 500 can be utilized in conjunction with the eSim user interface 400 of FIG. 4.

The object interface 500 can represent the user interface mechanism used to map processing simulation system objects and properties to spreadsheet objects. When invoked, programmatic code can first check to see if an object navigation object currently exists linking an open spreadsheet application file (e.g., workbook or spreadsheet) to flowsheet objects and properties. If so, the object navigation object, which can be a saved mapping file, can be opened. This file can be edited via user interactions with interface 500. Otherwise, an object navigation file can be created and stored.

The add input data interface 500 can include a data elements area 505, a properties area 515, an extensible markup language (XML) path area 530, a units of measure area 525, a property value 540, and an ADD button 535. The data elements area 505 can visually present the data elements 510 utilized by the process simulation system to simulate the process. A data element 510 can abstractly represent a container for properties 520 used within the simulation. The data elements 510 can be organized and presented as a hierarchical tree structure.

It should be emphasized, that the object navigation interface 500 can be dynamically populated at runtime in accordance with a flexible object model. Hence, no a priori knowledge of (simulation) object names is needed by an integration tool. For example, in one embodiment, the eSim integration tool can cause a control module (e.g., module 115, which can be an XLA) to call programming interface (e.g. interface 120) for unit sets and save them in a global variable for subsequent uses. The XLA can call the simulation interfaces (DLLs) to dynamically obtain a list of top objects, which can include flowsheets, streams, and operations. In one implementation, only the top three layers of the hierarchy need to be read in the initial loading of the flowsheet to save time and XML size. An object browser form can then be activated. The object tree view (data elements area 505) can then be populated with the top three layers of objects, as shown by data elements 510.

All supported process simulation objects can be displayed in a hierarchy as data elements 510. In one embodiment, by default, nodes can be stored by name and can be case insensitive. Node names can be concatenated with a number of subsequent child nodes in the format of "_( )". A single click on a node can be sufficient to expand its underlying structure. The object nodes can be read dynamically from the process simulation system through programming interface (e.g. interface 120), which causes the tree nodes in interface area 505 to expand accordingly.

Whenever an object is active in the data elements area 505, which can be changed by clicking a displayed object, its immediate properties are obtained dynamically and displayed in the properties area 515. Area 515 can display the various prosperities 520 of a selected object in a property tree. In one embodiment, property 520 names in the property tree can be appended by number of child nodes in the format of "_( )". For a matrix, the format is "_(,)".

Properties in the Property Tree displayed in area 515 can be color-coded, based on their specific abilities. For example, a black color can denotes calculated and blue can represent specifiable. Red can represent a default value; green can represent unknown; light silver can represent unsupported;

pinkish can represent mixed (i.e., for vector/matrix, some are calculated while others are specified). In one embodiment, only first and last elements of a vector can be checked. Specifiability for matrix may not be supported. The interface 500 can treats a scalar in a vector/matrix differently from a true scalar. The former can be called a UnisimElement, while the latter a UnisimTag.

If a "Hide Calculated in Input" option of interface 500 is enabled, the Property Tree shown in properties area 515 will be filtered out all calculated properties when the active cell falls in the input range. This is to prevent specifying calculated variables. Other options can be established for interface 500, and the "Hide Calculated in Input" option is provided as one contemplated example.

The XML path area 530 can display the XML attributes and values that can provide the underlying communicative link between the spreadsheet cell containing the user-configured input parameter and the process simulation system. The XML displayed within the XML path area 530 can be automatically generated by the case-based interface tool and can be optionally modified by the user.

For example, when a property 520 is in selected, its associated XML interpretation can be displayed in XML Path text box 530. The text in the text box can be copied to the active cell when the button "Add XML" 535 is clicked. Although editable, there may be no need to modify the text string manually. In one embodiment, it can be possible to hide the XML Path textbox 530 and to utilize interface 500 space for other purposes.

The units of measure area 525 can present the user with unit of measure options for the selected property 520. When allowed, the user can elect to change the unit of measure of the property from the unit of measure used by the process simulation system. For example, the user could change the options of the units of measure area 525 such that the displayed unit of measure would be ft$^3$/s instead of m$^3$/h. The conversion between specified units of measure can utilize the inherent functions of the underlying spreadsheet application.

The property value 540 can display the current value of the selected property 520. When allowed, the user can modify the property value 540. The add input data interface 500 can include data validation functions to ensure that changes to the property value 540 are within acceptable limits.

It should be noted that one special data element 510 that may require special handling in the object browser interface 500 is a simulation spreadsheet object. In one embodiment, a simulation spreadsheet object is selected in object tree area 505, only the last cell in the spreadsheet object is listed in property tree shown in area 515. When the last cell is selected in property tree, a set of spreadsheet object can be presented. The user can use those options to select the specific spreadsheet cell, such as column B, row Seven.

In one embodiment, numerous browser options can be associated with interface 500. These options can include, for example, a Use Description Option, a Hide Calculated in Input option, and a SS Cell Auto Move Right option. The Use Description option when enabled will permit the eSim interface to use simulation system object and property names to fill out the description of spreadsheet objects. This can be a nice feature to have when the user likes to quickly configure an eSim workbook but does not want to spend much time filling the descriptions. The Hide Calculated in Input option can allow eSim browser to filter out all the calculated properties when the active cell is within input range. This is to prevent accidental mapping of non-specifiable properties in input section. The SS Cell Auto Move Right options can be associated with the simulation system spreadsheet. When configuring a spreadsheet, the cell reference can move downward (by default) (row number ++1). By checking this option, the cell reference will move right (column number ++1 instead).

These options are not intended to be exhaustive and other configurable options for the eSim integration tool are contemplated. These options can help users configure, run, and manage eSim applications. In one embodiment, option values can be saved in a hidden "App Control Template" worksheet in an eSim workbook. The options can be grouped into categories, such as run options, browser options, and other.

Run options can include options shown in the following run option table (Note the following tables assume a UNISIM and EXCEL embodiment).

| OPTION NAME | DESCRIPTION |
|---|---|
| Run UniSim in Visible | UniSim will be visible when its calculation is ongoing, default = yes |
| UniSim Leave Open | UniSim flow sheet will not be closed after each calculation case, default = yes; if yes, the initial guess for second calc. case is the result of first calc. case; if no, the initial guess for each calc. case is whatever was saved in the flow sheet file |
| Save Change on Close | UniSim flow sheet will be save after each calc case, default = no |
| Run Oil Manager | Turn on AIC oil manager functionalities, default = no; no well tested |
| Force Download | Force UniSim application to reload the flowsheet each time a calc case is triggered, default = no |
| Disable PreCalc Macro | Disable an exposed macro eSim_UserPreCalc, default = yes; hint: customizable code can be executed before each case is triggered. For example, when multiple cases are triggered, PreCalc can massage the input data of current case based on the results of previous case. PreCalc code can be customized for each iteration for each calculation case. |
| Disable PostCalc Macro | Disable an exposed macro eSim_UserPreCalc, default = yes; hint: customizable code can be executed before each case is triggered. For example, when multiple cases are triggered, PreCalc can massage the input data of current case based on the results of previous case. PreCalc code can be customized for each iteration for each calculation case. |

-continued

| OPTION NAME | DESCRIPTION |
| --- | --- |
| Case Iterations | Number of iterations one case will be run, default = 1; hint: it is possible to run each case multiple times, combined with PreCalc and PostCal macros, one has the flexibility to do even the most complicated task in one case. |

Browser options can include options shown in the following option table (Note the following tables assume a UNISIM and EXCEL embodiment).

| OPTION NAME | DESCRIPTION |
| --- | --- |
| Auto Description | eSim browser generates descriptions for object (Property) automatically, default = no; the option can be overridden in browser form; hint: object is bold; property is in XML Path format in ( ). Nice feature to generate description in eSim template column B |
| Excel Auto Move Down: | This option is set to yes and not resettable. Once a object/property is set, the active cell is automatically moved down by one cell so the new active cell can be configured, default = yes |
| UniSim SS Auto Move Down | SS stands for spreadsheet, default = yes; the option can be overridden in browser form; it is a neat feature to have when one maps Excel cells to UniSim spreadsheet cells. Excel active cell is automatically moved down. Turn on this option will also automatically move UniSim Spreadsheet cell down (row number ++1). If this option is off (no), UniSim spreadsheet cell will automatically move right (column number ++1). |
| Allow UniSim SS Overrun | Allow eSim to map to the cell beyond UniSim spreadsheet boundary; default = no |
| Configure Matrix by Row | Default = yes; if no, then matrix will be group by column; the option can be overridden in browser form |
| Check Input Specifiable | When one configures eSim input section, eSim will check specifiability of the object/property one is adding. If not specifiable, a warning message pops up. User still has the option to add the object/property anyway or cancel; default = yes |
| Hide XML Path | When selected, a textbox showing XML info will be hidden and object node tree will be expand to fill the void, that give more real estate to object window to display more items, default = no; this option is actionable immediately |
| Object/Property Sorted | Default = yes, when selected, all items at the same level in both object and property windows are sorted. This option is needed when one is working on a large flowsheet; Names in column stages, vectors, and matrices are never sorted. |
| Hide Calculated in Input | Default = yes, the option can be overridden in browser form; if the option is yes, when active cell is in column A of input section, all the calculated objects will be filtered out, i.e. they will not be in property tree view |
| Analyze Specifiable | Default = yes; when selected, eSim will request AIC to analyze specifiability of each property associated with an object; hint: uncheck this option will speed up eSim browsing |

Other options can include options shown in the following option table (Note the following tables assume a UNISIM and EXCEL embodiment).

| OPTION NAME | DESCRIPTION |
| --- | --- |
| Show Error in Dialog | When enabled errors are displayed in a dialog window, otherwise they are not presented within a GUI interface. Default = enabled |
| Write Error in Log file | When enabled, errors are written to a log file and otherwise are not. Default = Disabled |

The diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A simulation system comprising:
at least one processor configured to execute a computer program product, said computer program product being stored upon a storage medium, said computer program product comprising a spreadsheet application, a process simulation application, and an integration tool, wherein the spreadsheet application and the process simulation application are discrete, stand alone products;
said spreadsheet application comprising a graphic user interface for interacting with users, said graphical user interface comprising a grid of a plurality of cells arranged in rows and columns, each cell being associated with a cell specific value able to be uniquely addressed as a spreadsheet object, wherein said spreadsheet application is configured to associate at least one formula with a cell, wherein a value of the cell is able to be calculated based upon said associated formula;
said process simulation application comprising a computer program product for simulating chemical processes using at least one flowsheet, which models a general flow of chemical plant processes and equipment; and
said integration tool comprising programmatic code for calculation orchestration, wherein said calculation orchestration permits sequential batch processing of multiple runs to be initiated by said user at a given time, and for mapping process simulation application objects and properties to spreadsheet application objects, for conveying information between mapped objects, for performing case management functions to (i) automatically combine results from different runs of a same flowsheet in a common mapped spreadsheet and to (ii) automatically map input data and output data simulation results from different flowsheets which have different process flow diagrams to different spreadsheets each as a separate column of a single spreadsheet workbook.

2. The simulation system of claim 1, wherein said programmatic code for calculation orchestration allows later runs of said multiple runs to utilize said input data created during earlier runs of said multiple runs.

3. The simulation system of claim 1, wherein the integration tool utilizes a flexible object model that dynamically determines process simulation application objects able to be mapped against spreadsheet application objects at runtime without a priori knowledge of names of available ones of the process simulation application objects.

4. The simulation system of claim 1, wherein said integration tool comprises a simulation control module and a programming interface; wherein the simulation control module interfaces with the spreadsheet application, and wherein the programming interface interfaces with the process simulation application, wherein all data conveyed between the spreadsheet application is conveyed between the spreadsheet application and the simulation control module, between the simulation control module and the programming interface, and the programming interface and the process simulation application.

5. The simulation system of claim 4, wherein the simulation control module is an add-in to the spreadsheet application, and wherein the programming interface comprises a set of dynamic link libraries (DLLs) for interfacing with the process simulation application.

6. The simulation system of claim 1, wherein each of the spreadsheet application and the process simulation system are commercial-off-the-shelf software applications, each having standard application program interfaces, wherein said integration tool utilizes the standard application program interfaces to exchange data with each of the spreadsheet application and the process simulation application.

7. The simulation system 6, wherein said software application comprises EXCEL and wherein said process simulation application comprises UNISIM.

8. The system of claim 1, wherein said graphic user interface is presented within a spreadsheet application window which includes a menu comprising menu items for said users, said menu items including items for loading existing simulation data, running a simulation, activating an object browser, and for modifying configuration options.

9. A method for performing chemical process simulations comprising:
from within a user interface of the spreadsheet application, receiving user input designating a flowsheet of a process simulation application;
from within the user interface of the spreadsheet application, initializing an object browser interface associated with the designated flowsheet;
dynamically determining at runtime objects associated with the flowsheet;
populating a hierarchy of objects in an object browser interface based upon results of the determining; receiving a user selection of one of the populated objects via the object browser interface;
dynamically determining at runtime properties associated with the selected one of the objects;
presenting said properties within a properties area of the object browser for user selection and manipulation; and
receiving user input from the object browser; based upon the user input,
mapping at least one flowsheet of a process simulation application to at least one spreadsheet of a spreadsheet application, wherein a one-to-one correspondence exists between flowsheets and spreadsheets, and wherein said spreadsheet application and said process simulation application are each discrete, stand-alone software products; and receiving an input to execute multiple runs of the flowsheet from a user interface of the spreadsheet application at a single given time, which results in sequential batch processing of multiple executions of the flowsheet by the process simulation application, wherein input used in the run is acquired from values specified in cells of a spreadsheet in accordance with the mapping, and wherein output data simulation results from the execution of the flowsheet is recorded in cells of the spreadsheet in accordance with the mapping, wherein said method further comprises performing case management functions, comprising:
  (i) automatically outputting combined results from a plurality of different runs of the same flowsheet to a common spreadsheet, where said output data simulation results from each run is associated with a run specific column of the common spreadsheet, wherein the plurality of runs are defined within the batch, and
  (ii) automatically mapping input data and said output data simulation results from a plurality of runs against different flowsheets having different process flow diagrams each as a separate column to a single workbook of the spreadsheet application, wherein the plurality of runs are defined within the batch.

10. The method of claim 9, further comprising: establishing via a user interface of the spreadsheet application a sequence of runs to be executed in order, wherein later ones of the runs utilize as said input data, said output data simulation results generated from earlier ones of the runs, wherein the input is acquired from values contained in spreadsheet cells; and initializing an execution of the sequence from the user interface of the spreadsheet application.

11. The method of claim 9, wherein said software application comprises EXCEL and wherein said process simulation application comprises UNISIM, wherein data exchanges between the software application and the process simulation application are conveyed between the software application to a plug-in to the software application, between the plug-in to a programmatic interface of the process simulation application that comprises a plurality of dynamic link libraries, and between the programmatic interface and the process simulation application.

12. A method for performing chemical process simulations comprising:

mapping at least one flowsheet of a process simulation application to at least one spreadsheet of a spreadsheet application, wherein a one-to-one correspondence exists between flowsheets and spreadsheets, and wherein said spreadsheet application and said process simulation application are each discrete, stand-alone software products;

acquiring input for a flowsheet run executed by the simulation application from a spreadsheet of the spreadsheet application based upon the mapping;

conveying output data simulation results from the flowsheet run executed by the simulation application to a spreadsheet based upon the mapping; and sequencing a batch of a plurality of runs of the process simulation application, wherein each run results in a flowsheet execution by the process simulation application based upon input acquired from a spreadsheet, wherein input utilized in later ones of the sequenced runs is obtained from said output data simulation results from earlier ones of the runs of the batch, wherein said method further comprises performing case management functions, comprising:
  (i) automatically outputting combined results from a plurality of different runs of the same flowsheet to a common spreadsheet, where said output data simulation results from each run is associated with a run specific column of the common spreadsheet, wherein the plurality of runs are defined within the batch, and
  (ii) automatically mapping input data and said output data simulation results from a plurality of runs against different flowsheets having different process flow diagrams each as a separate column to a single workbook of the spreadsheet application, wherein the plurality of runs are defined within the batch.

13. The method of claim 12, further comprising:

from within an interface of the spreadsheet application, loading a flowsheet; dynamically determining at runtime objects associated with the flowsheet; populating a hierarchy of objects in an object browser interface based upon results of the determining; determining an active one of the objects presented within the object browser interface; dynamically determining at runtime properties associated with the active one of the objects; presenting said properties within a properties area of the object browser for user selection and manipulation; and receiving user input from the object browser, wherein said mapping is dependent upon and is based upon the received user input.

14. The method of claim 12, further comprising; adding a plug-in module to the spreadsheet application, wherein said plug-in module enhances user interface of the spreadsheet application to add user selectable interface elements for mapping the spreadsheet to the flowsheet and for initiating the runs that are executed by the process simulation application.

15. The method of claim 12, further comprising: exchanging data between the spreadsheet application and the process simulation application by exchanging data between the spreadsheet application and a simulation control module that extends the spreadsheet application, between the simulation control module and a programming interface, said programming interface comprising a plurality of dynamic link libraries (DLLs) specific to the process simulation application, and between the programming interface and the process simulation application.

16. The method of claim 12, wherein said mapping, acquiring, conveying, and sequencing are steps performed automatically by at least one machine in accordance with at least one computer program having a plurality of code sections that are executable by the at least one machine, said at least one computer program being stored in a machine readable medium.

* * * * *